United States Patent Office 3,189,552
Patented June 15, 1965

3,189,552
STABLE SOLVENT COMPOSITION

Leslie L. Sims, Baton Rouge, La., assignor to Ethyl Corporation, New York, N.Y., a corporation of Virginia No Drawing. Filed Feb. 5, 1963, Ser. No. 256,252
5 Claims. (Cl. 252—153)

This application is a continuation-in-part of application Serial No. 795,317, now abandoned.

This invention relates to chlorinated solvents, and particularly to new and highly effective stabilized methyl chloroform compositions particularly suitable for the liquid and vapor phase degreasing of metals.

Chlorinated aliphatic hydrocarbons are useful as silvents for the degreasing of metals, for dry cleaning and for many other purposes. Such solvents are particularly useful in the degreasing of metals because of their low flammability and high solvency for oils and greases. Among the most widely used of these solvents are carbon tetrachloride, ethylene dichloride, trichloroethylene and perchloroethylene.

A highly desirable chlorinated hydrocarbon is methyl chloroform, or 1,1,1-trichloroethane, which is known to have exceptionally good solvency powers and other highly desirable properties, particularly for metal cleaning operations. Very unfortunately, however, this particular solvent exhibits an aggravated tendency to decompose and concurrently attack metals, both at ambient or storage conditions, and at elevated temperatures suitable for cleaning operations. The reason for this marked inadequacy of 1,1,1-trichloroethane is not understood. The weakness is thought to be because of the number of chlorine atoms attached to a single carbon atom within the molecular structure of 1,1,1-trichloroethane. But whatever the explanation, the above described deficiency has deterred commercial usage of the solvent. A significant need therefore exists for stabilized methyl chloroform compositions, particularly those suitable for the elevated temperature of treatment of iron, copper, aluminum, zinc and other easily corroded metals.

From the standpoint of metal induced decomposition, 1,1,1-trichloroethane departs drastically from other chlorinated hydrocarbons. For example, metals, especially aluminum, will last for days or weeks without being attacked by ordinary chlorinated hydrocarbon solvents, but in the presence of 1,1,1-trichloroethane, however, aluminum is vigorously attacked and the 1,1,1-trichloroethane solvent reduced to a blackened or charred mass within minutes. Only a few stabilizers are known which are reasonably effective in inhibiting 1,1,1-trichloroethane against such attack and why these few stabilizers are effective is not known. The mere fact however that a stabilizer will inhibit decomposition of other chlorinated hydrocarbons means absolutely nothing in relation to stabilizing 1,1,1-trichloroethane.

The provision of an effective vapor phase stabilizer for 1,1,1-trichloroethane involves even more complications. In this instance the stabilizer must serve a dual requirement, e.g. it must stabilize the 1,1,1-trichloroethane in the vapor phase as well as in the liquid phase. Moreover, the stabilizer must be sufficiently volatile to provide a sufficient quantity of stabilizer in the vapor of the solvent to inhibit the vapor but the stabilizer must not be so volatile as to unduly deplete the liquid phase. In addition, the rate and extent of metal induced decomposition are intensified with increasing temperature, elevated temperatures often being desirable to effect degreasing.

It is accordingly the object of this invention to provide stabilized methyl chloroform compositions which are highly effective for the liquid and vapor phase degreasing of aluminum, iron, copper, zinc and other metals. A particular object is to provide methyl chloroform solvent systems which retain chemical passivity during repeated cycles of exposure to metals at processing conditions. Other objects will appear hereinafter.

The present invention is a stable solvent composition comprising methyl chloroform having dissolved therein a minor and stabilizing amount of a mixture of an amine (or other basic nitrogenous organic compound) and a nitroaliphatic compound, preferably a nitroalkane having from 1 to 2 carbon atoms in the molecule. The amine or basic nitrogenous organic compound has the following general formula

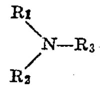

wherein $R_1$ may be an alkyl, alkylol, aryl, aralkyl, hydroaryl, or heterocyclic radicals; $R_2$ and $R_3$ may be hydrogen, hydrozol, alkyl, alkylol, aryl, aralkyl, hydroaryl, or heterocyclic radicals. Heterocyclic nitrogen compounds are also suitable. The nitroaliphatic compound has the general formula $R_4NO_2$ wherein $R_4$ is an aliphatic hydrocarbon radical having not more than 3 carbon atoms. Specific examples of the amines which may be used are such aliphatic amines as n-butyl, diisopropyl amine, amyl amine, diamyl amine, triamyl amine, triethyl amine, tributyl amine, cetyl amine, ethanol amine, diethanol amine, triethanol amine, propanol amine, ethylene diamine, propylene diamine, diethylene triamine, triethylene tetraamine, tetraethylene pentaamine; such aromatic amines as aniline, methyl aniline, dimethyl aniline, diamyl aniline, toluidine, xylidene, diphenyl amine, triphenyl amine, nitroaniline, phenylene diamine, amino phenyl, amino diphenyl, benzidine, benzamide, acetanilide, acetoacetanilide; and nitrogen bases or heterocyclic amines as pyridine, pyrrol, pyrrolidine, piperidine, lutidine, aminobenzofurane, morpholine, benzimidazol, carbazol, nicotinic acid, picoline and brucine.

Of the above compounds particularly preferred amines are trialkyl amines containing from 1 to about 6 carbon atoms in each alkyl group. Examples of these preferred amines are trimethyl amine, triethyl amine, methyldiethyl amine, tri-n-propyl amine, triisopropyl amine, ethyldiisopropyl amine, tri-n-butyl amine, triisobutyl amine, tri-n-pentyl amine, triisopentyl amine, methylethyl-n-pentyl amine, tri-n-hexyl amine, triisohexyl amine, tri-sec-hexyl amine, and the like. Examples of mononitroaliphatic compounds useful in the invention include nitromethane, nitroethane, nitroethylene, nitroacetylene, 2-nitropropane, 1-nitropropylene, 2-nitro-1-propane, 1-nitro-2-propyne, etc. Of the nitroaliphatic compounds nitromethane and nitroethane are particularly preferred.

It has been found that relatively minor amounts of a mixture of the foregoing compounds, viz. amines and nitroaliphatic compounds, form highly stable methyl chloroform compositions, and are highly beneficial for the liquid and vapor phase degreasing of metals. It has been found that the stabilizer pair produces far greater benefits than can be attributed to the use of either compound alone. This benefit is greatly unexpected. A highly preferred stabilized composition of this type is 1,1,1-trichloroethane containing an inhibiting amount of a stabilizer pair consisting essentially of a trialkylamine having from 1 to about 6 carbon atoms in each alkyl group and a mononitroalkane having from 1 to 2 carbon atoms in the molecule.

Generally, it is required that the quantity of either component within the stabilizing mixture should be present in at least about 10 percent by weight of the compound which is used in the highest concentration. The sum total weight of the mixture of stabilizers used in any given chlorinated hydrocarbon solvent should be between about 0.3 and 12 percent of the solvent composition employed. Good results can be obtained when about 1 to about 4 percent by weight of a mixture of the above components are present in the chlorinated hydrocarbon solvent. Preferably, a weight concentration of the sum total or mixture of the stabilizing components is about 2 percent of the weight of the solvent employed. Generally, the individual components can be mixed together in substantially equal volumetric amounts and added to the chlorinated hydrocarbon solvents and excellent results obtained.

As indicated above, stabilized liquid compositions of the present invention show little or no tendency to attack metals even at boiling conditions. The stabilized liquid can be stored for considerable periods of time, usually for months, in contact with aluminum, iron, copper, zinc and various metals, or alloys thereof, without significant decomposition. Also, vapors evolved from many of the stabilized liquid compositions show no tendency to attack metals. This makes many of the present solvent compositions highly effective for vapor phase degreasing operations.

For vapor degreasing applications, it is essential that the chlorinated hydrocarbon or 1,1,1-trichloroethane composition be not only stable in the liquid state but also that it be susceptible to vaporizing and condensing with full retainment of stability. This can be accomplished if an inhibitor has sufficient volatility to be carried into the vapor space in sufficient quantities to stabilize the latter without unduly depleting the liquid phase. In the instant case the preferred stabilizers described above provide excellent vapor phase inhibitors from the standpoint of volatility because the concentration of the additives in the vapor phase is very high in relation to their concentration in the liquid phase over a considerable concentration range, beyond the concentration thereof in a chlorinated hydrocarbon solvent necessary for effective stabilization, as hereinafter expressed.

Accordingly a preferred embodiment of this invention is the provision of a stabilized composition for metal degreasing consisting essentially of a 1,1,1-trichloroethane having dissolved therein a stabilizing mixture of a trialkyl amine wherein each alkyl group contains from 1 to about 6 carbon atoms (most preferably, triethyl amine) and a mononitroalkane having from 1 to 2 carbon atoms in the molecule (most preferably, nitromethane), these being present in an amount sufficient to stabilize the 1,1,1-trichloroethane against metal induced decomposition, either component of said stabilizing mixture being present in at least about 10 percent by weight of the other component, and the concentration of the stabilizing mixture being from about 0.3 to about 12 (and more preferably from about 1 to about 4) weight percent concentration based on the weight of the 1,1,1-trichloroethane.

The following examples demonstrate the effectiveness of stabilized 1,1,1-trichloroethane solvent in the liquid and vapor phase even at threshold conditions. In each of the demonstrations tared polished strips of aluminum, iron and copper metals were placed in glass flasks. The lower ends of the strips were immersed in the liquid and the upper end exposed only to the vapors. The strips were exposed to the boiling solvent for one and one-half hours and at the end of this time were dried and reweighed. Corrosion is measured by the observed loss of weight of the individual metal strips.

The following example demonstrates the benefits derived from a stabilized 1,1,1-trichloroethane composition, or more specifically, such solvent stabilized with an "inhibiting amount" of a mixture of an amine and a nitroaliphatic compound.

EXAMPLE I

A series of three runs was performed as shown by the figures opposite Runs 1, 2 and 3 in the table below. Metallic strips of iron, copper and aluminum were subjected to refluxing conditions for one and one-half hours, at ambient pressure. The weight percentages of the stabilizers present, based on the weight of the 1,1,1-trichloroethane solvent, is shown in the first columns opposite the particular run or demonstration. The weight percent loss, based on the original weight of the particular metallic strip as contrasted with its final weight at the end of the demonstration is shown for each of the metals in the next series of columns. Run 1 reflects the results obtained from the use of triethylamine in 1,1,1-trichloroethane, and Run 2 demonstrates the results obtained by the use of nitromethane alone. Run 3 demonstrates the results provided by using a mixture of triethylamine and nitromethane. Thus, the advantages derived from the use of this mixture to stabilize 1,1,1-trichloroethane against iron, copper, and aluminum metal is vastly superior to the use of either component alone.

In order to contrast the benefits derived from the use of stabilized 1,1,1-trichloroethane, the following demonstration was performed under less rigorous conditions but without the benefits of a stabilizer mixture of this invention.

A polished aluminum workpiece was completed immersed in pure, dry 1,1,1-trichloroethane within a containing vessel. The contents of the vessel were maintained at room temperature, approximately 25° C., and subjected only to diffused light. Within three minutes a visible bubbling reaction began with discoloration of the 1,1,1-trichloroethane and deposition of carbonaceous material. At the end of 25 minutes the aluminum workpiece was withdrawn from the 1,1,1-trichloroethane solvent which was by that time completely opaque. The aluminum workpiece was badly corroded and portions thereof had been completely eaten away.

The following example demonstrates a stabilized solvent composition of the same type as used in the Example I except that in this instance a higher concentration of the stabilizing mixture of triethylamine and nitromethane is used.

*Table*

| Run | Weight concentration of components added | | | Weight percent loss of metal strip | | |
|---|---|---|---|---|---|---|
| | Triethylamine | Nitromethane | Total concentration | Iron | Copper | Aluminum |
| 1 | 0.28 | 0.0 | 0.28 | 0.70 | 0.19 | 19.0 |
| 2 | 0.0 | 0.51 | 0.51 | 0.049 | 0.055 | 2.7 |
| 3 | 0.14 | 0.21 | 0.35 | 0.00 | 0.00 | 0.01 |

EXAMPLE II

The foregoing example is repeated in all details except that in this instance a 2 weight percent concentration of the mixture of triethylamine and nitromethane in 1,1,1-trichloroethane is used and the refluxing is conducted for a period of 12 hours. The stabilizing effect of the system, as evidenced by the time required for the metal strips to show any loss of weight, is far superior to the results obtained by the use of a lower weight composition of the mixture of stabilizers in the 1,1,1-trichloroethane solvent. The greatly superior advantage of the stabilizer pair, over the use of the individual components of the mixture, is again demonstrated as in the foregoing example.

EXAMPLE III

The foregoing example is again repeated except that in this instance a 5 weight percent solution of the mixture of triethylamine and nitromethane in 1,1,1-trichloroethane is formed. The same superior results are again obtained over that of stabilized 1,1,1-trichloroethane solvent compositions wherein the stabilizing compounds are used individually.

Having demonstrated the specific advantages derived from the use of a stabilizer pair consisting of triethylamine and nitromethane, to stabilize 1,1,1-trichloroethane, the following examples demonstrate other basic nitrogenous organic compounds and nitroaliphatic compounds which can be employed as a stabilizer pair for methyl chloroform, in the presence of iron, copper, aluminum and zinc metals.

Examples IV through VII demonstrate the use of various nitroaliphatic compounds used as one moiety of the stabilizer pair to prevent decomposition of 1,1,1-trichloroethane.

EXAMPLE IV

Examples I through III are again repeated except that in this instance nitroacetylene is employed as the nitroaliphatic portion of the stabilizing mixture for 1,1,1-trichloroethane. Again as in the foregoing highly satisfactory results are obtained.

EXAMPLE V

Again Examples I through III are repeated except that in this instance nitropropane is used as the nitroaliphatic portion of the stabilizer pair. Again highly beneficial results are obtained.

EXAMPLE VI

Examples I through III are again repeated except that in this instance 2-nitro-1-propene is employed in combination with triethylamine. Highly beneficial results are obtained as in the foregoing.

EXAMPLE VII

In this example, Examples I through III are again repeated except that in this instance 1-nitro-2-propyne is employed as the nitroaliphatic compound of the stabilizer pair. Again highly satisfactory results are obtained.

The following examples demonstrate systems wherein basic nitrogenous organic compounds are employed as a portion of the stabilizing mixture; viz. Examples VIII through X demonstrate aliphatic amines, Examples XI through XIII demonstrate various aromatic amines, and Examples XIV through XVI demonstrate heterocyclic amines and nitrogen bases.

EXAMPLE VIII

Examples I through III are again repeated except that in this instance n-butyl amine is employed as the amine portion of the stabilizer pair. Again, as in the foregoing examples, highly satisfactory results are obtained.

EXAMPLE IX

Examples I through III are again repeated except that in this instance diethylene triamine is employed as a portion of the stabilizer mixture. Again, as in the foregoing, highly satisfactory results are obtained.

EXAMPLE X

Again Examples I through III are repeated and in this instance tetraethylene pentaamine is employed as the amine portion of the stabilizer pair. Again highly beneficial results are obtained.

Having demonstrated examples of various aliphatic amines, the following examples demonstrate preferred aromatic amines.

EXAMPLE XI

Examples I through III are again repeated and in this instance aniline is employed as a portion of the stabilizing mixture. Again, as in the foregoing, highly beneficial results are obtained.

EXAMPLE XII

Again Examples I through III are repeated but in this instance toluidine is employed as the amine portion of the stabilizer pair. Again highly beneficial results are obtained as in the foregoing.

EXAMPLE XIII

Examples I through III are again repeated except that in this instance acetoacetanilide is employed as the basic nitrogenous organic compound portion of the stabilizer pair and as in the foregoing highly beneficial results are obtained.

The following examples demonstrate the beneficial results obtained from a stabilizer pair of the type mentioned wherein a heterocyclic amine or a nitrogen base is a component of the stabilizer pair.

EXAMPLE XIV

Examples I through III are repeated except that in this instance pyridine is employed as a portion of the stabilizer pair. Again highly beneficial results are obtained.

EXAMPLE XV

Examples I through III are again repeated but in this instance morpholine is employed as a portion of the stabilizing mixture. Again highly desirable results are obtained.

EXAMPLE XVI

Again Examples I through III are repeated except that in this instance brucine is employed as a portion of the stabilizer pair. Again highly beneficial results are obtained.

It will be understood that certain minor modifications can be made in the above process without departing from the spirit and scope of the invention. For example, it will be understood that "metal" as used in the foregoing specification includes at least aluminum, iron and copper. It is also used to include the various alloys as well as the elemental metal. By "inhibiting amount" of any of the compounds is meant any amount thereof added to stabilize the various chlorinated hydrocarbon solvents against decomposition. A certain minimum concentration of the mixed stabilizers must be added to effectively stabilize the chlorinated hydrocarbon solvents, i.e., on the order of about a 0.3 percent weight concentration of the mixture based on the weight of the said stabilized solvent, though this can vary slightly with temperature and with the number and quantity of other materials present which tend to accelerate the reaction. The upper concentration limit of the mixed stabilizers in the chlorinated hydrocarbon solvents is much less critical, any concentration greater than the minimum concentration producing a stabilized solvent. Greater concentrations can be used quite successfully.

I claim:

1. A stabilized composition for metal degreasing consisting essentially of 1,1,1-trichloroethane having dissolved therein a stabilizing mixture of a trialkyl amine wherein each alkyl group contains from 1 to about 6 carbon atoms and a mononitroalkane having from 1 to 2 carbon atoms in the molecule, these being present in an amount sufficient to stabilize the 1,1,1-trichloroethane against metal-induced decomposition, either component of said stabilizing mixture being present in at least about 10 percent by weight of the other component and the concentration of the stabilizing mixture being from about 0.3 to about 12 weight percent based on the weight of the 1,1,1-trichloroethane.

2. The composition of claim 1 wherein said trialkyl amine is triethyl amine.

3. The composition of claim 1 wherein said mononitroalkane is nitromethane.

4. The composition of claim 1 wherein the concentration of said stabilizing mixture is from about 1 to about 4 weight percent based on the weight of the 1,1,1-trichloroethane.

5. A stabilized composition for metal degreasing consisting essentially of 1,1,1-trichloroethane having dissolved therein a stabilizing mixture of triethyl amine and nitromethane, either component of said stabilizing mixture being present in at least about 10 percent by weight of the other component, and the concentration of the stabilizing mixture being from about 1 to about 4 weight percent based on the weight of the 1,1,1-trichloroethane.

References Cited by the Examiner

UNITED STATES PATENTS 2,923,747 2/60 Rapp ------------ 252—171 XR
3,031,412 4/62 Petering et al. --------- 252—171

FOREIGN PATENTS 765,522 1/57 Great Britain.

JULIUS GREENWALD, *Primary Examiner.*